(12) United States Patent  (10) Patent No.: US 8,320,411 B1
Sedarat et al.                (45) Date of Patent:     Nov. 27, 2012

(54) FAST RETRAINING FOR TRANSCEIVERS IN COMMUNICATION SYSTEMS

(75) Inventors: Hossein Sedarat, San Jose, CA (US);
Paul Langner, Fremont, CA (US);
Ramin Shirani, Morgan Hill, CA (US);
Ramin Farjadrad, Los Altos, CA (US)

(73) Assignee: Aquantia Corporation, Milpitas, CA (US)

( * ) Notice: Subject to any disclaimer, the term of this patent is extended or adjusted under 35 U.S.C. 154(b) by 546 days.

(21) Appl. No.: 12/604,358

(22) Filed: Oct. 22, 2009

Related U.S. Application Data

(63) Continuation of application No. 12/551,347, filed on Aug. 31, 2009, now abandoned.

(60) Provisional application No. 61/148,112, filed on Jan. 29, 2009.

(51) Int. Cl.
*H04J 3/06* (2006.01)
*G01R 31/08* (2006.01)
*H04L 7/00* (2006.01)

(52) U.S. Cl. .................. 370/503; 370/241; 375/354

(58) Field of Classification Search .................. 370/241, 370/503; 375/354
See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 5,832,032 A | 11/1998 | Overbury | |
| 5,995,566 A | 11/1999 | Rickard et al. | |
| 5,995,567 A | 11/1999 | Cioffi et al. | |
| 6,052,420 A | 4/2000 | Yeap | |
| 6,385,315 B1 | 5/2002 | Viadella et al. | |
| 6,690,739 B1 | 2/2004 | Mui | |
| 6,711,207 B1 | 3/2004 | Amrany et al. | |
| 6,734,659 B1 | 5/2004 | Fortner | |
| 6,924,724 B2 | 8/2005 | Grilo et al. | |
| 6,959,056 B2 | 10/2005 | Yeap et al. | |
| 7,026,730 B1 | 4/2006 | Marshall et al. | |
| 7,123,117 B2 | 10/2006 | Chen et al. | |
| 7,200,180 B2 | 4/2007 | Verbin et al. | |
| 7,315,592 B2 | 1/2008 | Tsatsanis et al. | |
| RE40,149 E | 3/2008 | Vitenberg | |
| 7,492,840 B2 | 2/2009 | Chan | |
| 7,656,956 B2 | 2/2010 | King | |
| 7,708,595 B2 | 5/2010 | Chow et al. | |
| 2003/0186591 A1 | 10/2003 | Jensen et al. | |

(Continued)

FOREIGN PATENT DOCUMENTS

WO  WO 97/40587  10/1997

OTHER PUBLICATIONS

U.S. Appl. No. 12/977,844, filed Dec. 23, 2010, Sedarat.

(Continued)

*Primary Examiner* — Ricky Ngo
*Assistant Examiner* — Paul H Masur
(74) *Attorney, Agent, or Firm* — Mahamedi Paradice Kreisman LLP

(57) ABSTRACT

Fast retraining of communication parameters for a transceiver in a communication network. In one aspect, it is determined that the transceiver has lost the communication link for data communication, and the transceiver receives a signal providing a fast retraining sequence that updates transceiver parameters in order to reacquire the link for the data communication. The fast retraining sequence is performed in a reduced time relative to a full training sequence used for initializing the parameters for data communication by the transceiver.

23 Claims, 4 Drawing Sheets

U.S. PATENT DOCUMENTS

| | | | |
|---|---|---|---|
| 2003/0223505 A1 | 12/2003 | Verbin et al. | |
| 2004/0023631 A1 | 2/2004 | Deutsch et al. | |
| 2004/0239465 A1 | 12/2004 | Chen et al. | |
| 2005/0025266 A1 | 2/2005 | Chan | |
| 2005/0053229 A1 | 3/2005 | Tsatsanis et al. | |
| 2006/0159186 A1 | 7/2006 | King | |
| 2007/0081475 A1* | 4/2007 | Telado et al. | 370/255 |
| 2007/0192505 A1* | 8/2007 | Dalmia | 709/233 |
| 2008/0089433 A1 | 4/2008 | Cho et al. | |
| 2009/0097401 A1* | 4/2009 | Diab | 370/230 |
| 2009/0154455 A1* | 6/2009 | Diab | 370/389 |
| 2010/0046543 A1* | 2/2010 | Parnaby | 370/465 |
| 2010/0111202 A1 | 5/2010 | Schley-May et al. | |

OTHER PUBLICATIONS

U.S. Appl. No. 12/563,938, filed Sep. 21, 2009, Sedarat.
U.S. Appl. No. 12/604,323, filed Oct. 22, 2009, Sedarat et al.
U.S. Appl. No. 12/604,343, filed Oct. 22, 2009, Farjadrad et al.
U.S. Appl. No. 12/604,351, filed Oct. 22, 2009, Sedarat et al.

* cited by examiner

FAST RETRAINING FOR TRANSCEIVERS IN COMMUNICATION SYSTEMS

CROSS REFERENCE TO RELATED APPLICATIONS

This application is a continuation of U.S. patent application Ser. No. 12/551,347, filed Aug. 31, 2009;

This application claims the benefit of U.S. Provisional Application No. 61/148,112, filed Jan. 29, 2009, and entitled, "Fast Retrain to In Decision-Directed Communication Systems," which is incorporated herein by reference in its entirety.

This application is related to:

U.S. patent application Ser. No. 12/604,351, entitled, "Rejecting RF Interference in Communication Systems," filed concurrently herewith and assigned to the assignee of the present invention;

U.S. patent application Ser. No. 12/604,323, entitled, "Common Mode Detector for a Communication System," filed concurrently herewith and assigned to the assignee of the present invention;

U.S. patent application Ser. No. 12/604,343, entitled, "Magnetic Package for a Communication System," filed concurrently herewith and assigned to the assignee of the present invention;

U.S. patent application Ser. No. 12/551,210, entitled, "Rejecting RF Interference in Communication Systems," filed Aug. 31, 2009 and assigned to the assignee of the present invention;

U.S. Provisional Application No. 61/153,440, filed Feb. 18, 2009, entitled, "Methods of Rejecting RE Interference in 10GBase-T Communication Systems";

U.S. patent application Ser. No. 12/551,340, entitled, "A Common Mode Detector for a Communication System," filed Aug. 31, 2009 and assigned to the assignee of the present invention;

U.S. Provisional Application No. 61/141,640, filed Dec. 30, 2008, entitled, "Methods and Apparatus to Detect Common Mode Signal in Wireline Communication Systems";

U.S. Provisional Application No. 61/141,639, filed Dec. 30, 2008, entitled, "Methods and Apparatus Detect Common Mode Signal in Wireline Communication Systems";

U.S. patent application Ser. No. 12/563,938, entitled, "Cancellation of Alien Interference in Communication Systems," filed Sep. 21, 2009 and assigned to the assignee of the present invention;

U.S. patent application Ser. No. 12/551,396, entitled, "Cancellation of Alien Interference in Communication Systems," filed Aug. 31, 2009 and assigned to the assignee of the present invention;

U.S. Provisional Application No. 61/099,979, filed Sep. 25, 2008, entitled, "Interference Cancellation in 10GBASE-T and Other Multi Channel Communication Systems";

U.S. patent application Ser. No. 12/551,326, entitled, "A Magnetic Package for a Communication System," filed Aug. 31, 2009 and assigned to the assignee of the present invention;

U.S. Provisional Application No. 61/173,394, filed Apr. 28, 2009, entitled, "Integrated Common-Mode Transformer for Detection of Electromagnetic Interference on the Channel";

all of which are incorporated herein by reference in their entireties.

FIELD OF THE INVENTION

The present invention relates generally to electronic communications, and more particularly to the operation of transceivers used for transmission and reception of data in communication networks.

BACKGROUND OF THE INVENTION

Communication systems are widely used in computer and device networks to communicate information between computers and other electronic devices. Transceivers of a communication system send and receive data over a communication link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet which includes several different standards for different network bandwidths, including 10GBASE-T allowing 10 gigabit/second connections over unshielded or shielded twisted pair cables.

There are many blocks in a typical receiver of a communication system which must operate near an optimal operating point in order that there be robust detection of data transmitted on a communication link. The optimal operating point is usually determined through an initial training process in which the far-end transmitter sends a known training signal and the receiver optimizes its own parameters using the training signal and a training method. Some of the receiver blocks that require training are the receiver gain block, equalizers (both feed-forward and feedback), echo and cross-talk cancellers, and timing recovery. The training methods typically find the optimal receiver parameters by minimizing some measure of error. The error is usually identified as the difference of the known transmit data and the received data decoded by the receiver.

In addition to the initial training period, the receiver has to update its parameters constantly to track the changes in the communication link as well as the noise sources. In some communication systems, the transmitters re-send the training sequence periodically in predefined intervals to provide the far-end receiver opportunities to adapt to the new channel and noise conditions. In other communication systems, where the communication channels and noise sources change slowly, the adaptation may be done without any interruption in data transmission. In such systems, the mismatch between the current and the optimal receiver settings are assumed to be sufficiently small such that the receiver decodes the transmit data correctly with high probability. With that assumption, the decoded data can be used in lieu of the training signal to calculate the error signal, which in turn is used for parameter optimization. This method of parameter update is often referred to as "decision-directed" because the error signal is derived from the decisions that the receiver makes to decode the transmitted data.

A decision-directed update method relies on the fundamental assumption that the receiver mostly decodes the data correctly. This is true only when the rate of changes in the channels and noise sources is sufficiently slower than the update rate of the receiver parameters. Under this condition, the receiver operating point never deviates significantly from the optimal point. If this condition is not met, then the estimated error signal calculated from the decoded data may not be a good representative of the real error signal. This may cause the update method to choose parameters that are far from optimal, and these non-optimal receiver settings will in turn cause further error in the decoded data. This creates a positive feedback that deteriorates the receiver operation very quickly and usually results in the failure of the communication link. Once the link has failed, the transceivers must go through a full training sequence to reestablish the link, which is a fairly long process, and requires processing time and resources which often are not fully needed to reestablish the link.

Accordingly, what is needed are systems and methods that allow for less time in retraining transceiver parameters after deterioration or failure of a communication link in a communication system.

SUMMARY OF THE INVENTION

Fast retraining of communication parameters for a transceiver in a communication network is disclosed. In one aspect, a method for providing a fast retraining of parameters for a transceiver after the loss of a communication link includes determining that the transceiver has lost the communication link for data communication, and receiving at the transceiver a signal providing a fast retraining sequence that updates the parameters of the transceiver in order to reacquire the communication link for the data communication. The fast retraining sequence is performed in a reduced time relative to a full training sequence used for initializing the parameters for data communication by the transceiver.

In another aspect, a method for enabling a fast retraining of parameters for a transceiver after the loss of a communication link includes using a first transceiver to negotiate with a second transceiver over the communication link to initialize settings to use for communication over the communication link. The negotiating includes determining whether the first and second transceivers are compatible with a fast retraining sequence for updating the parameters to allow a re-establishment of a lost communication link. Data is communicated between the first and second transceivers over the communication link. The fast retraining sequence requires less time than a full training sequence that initializes the parameters.

In another aspect, a transceiver includes a fast retraining of parameters after the loss of a communication link, the transceiver being connected to a communication network. The transceiver includes a transmitter operative to transmit data on the communication link, and a receiver operative to receive data from the communication network. After the communication link has been lost to data communication, the receiver receives a signal providing a fast retraining sequence that updates the parameters of the transceiver in order to reacquire the communication link for the data communication, the fast retraining sequence being performed in a reduced time relative to a full training sequence used for initializing the parameters.

The inventions disclosed herein are related to a fast retraining of transceiver parameters that allow a transceiver to recover nominal data communication over a lost communication link after a shorter retraining time in comparison to using the full training of prior implementations.

DETAILED DESCRIPTION OF PREFERRED EMBODIMENTS

The present invention relates generally to electronic communications, and more particularly to the operation of transceivers used for transmission and reception of data in communication networks. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The inventions disclosed herein describe aspects of a fast retraining scheme that reduce the time needed to recover a lost communication link. Some embodiments provide retraining only transceiver parameters that need adjustment. The inventions are described in the context of a 10GBASE-T communication system but are equally applicable to many other communication standards and systems. Furthermore, the present inventions are suitable for decision-directed communication systems but also may be employed in other types of communication systems.

Figure 1:
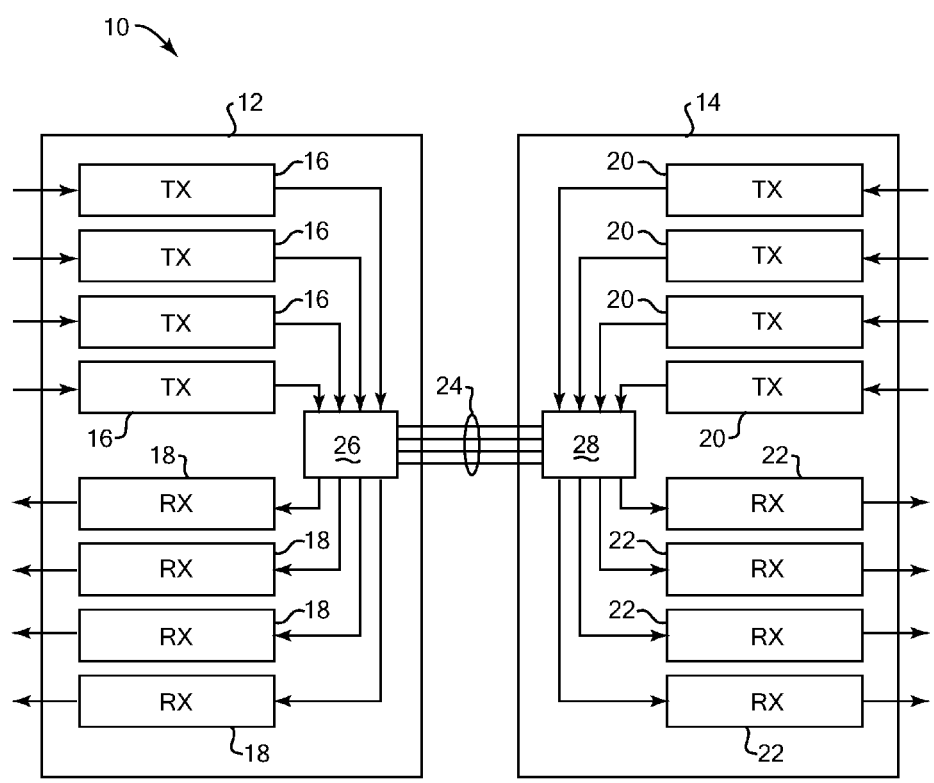
FIG. 1 is a block diagram illustrating a communication system suitable for use with the present invention.

FIG. 1 is a block diagram illustrating an example communication system 10 suitable for use with the present invention. System 10 includes a first transceiver 12 and a second transceiver 14 which can communicate with each other. Transceiver 12 includes "transceiver components" including one or more transmitters 16 and one or more receivers 18. Similarly, transceiver 14 includes transceiver components including one or more transmitters 20 and one or more receivers 22. The transmitters 16 (and 20) shown in FIG. 1 can be considered individual "transmitters," as typically referenced herein, or can be considered individual transmitter channels which a transmitter block within the transceiver can independently transmit signals on. Similarly, receivers 18 (and 22) can be considered individual "receivers," as typically referenced herein, or can alternately be considered individual receiver channels which a receiver block within the transceiver can independently receive signals on. The transmitters 16 and 20 and receivers 18 and 22 are connected to one or more components (not shown) of a computer system, device, processor, or other "controller" associated with each respective transceiver which want to communicate data over the communication network. For example, transmitters 16 receive data and control signals from the controller connected to transceiver 12 in order to send the data over the network to other transceivers and controllers, while receivers 18 receive data from other transceivers and controllers via the network in order to provide the data to the controller connected to first transceiver 12.

The transceiver 12 can communicate with the transceiver 14 over one or more communication channels of a communication link 24. For example, for the 10GBASE-T Ethernet standard, four communication channels are provided on link 24, each channel including a twisted pair cable. Thus, in that standard, there are four transmitters 16 and four corresponding receivers 18 provided in each of the transceivers 12 and 14, each transmitter associated with one of the local near-end receivers in the same transceiver, and each such transmitter/receiver pair dedicated to one channel used for duplex communication. A transmitter/receiver pair in one transceiver 12 communicates across a channel of link 24 to a far-end transmitter/receiver pair in transceiver 14. A transmitter 16 and a receiver 22 that are connected to the same channel/link, or two transceivers connected by the communication link 24, are considered "link partners."

An interface 26 can be provided in transceiver 12 and an interface 28 can be provided in transceiver 14 to allow data transmissions between the transceivers to be routed to the appropriate transceiver blocks. For example, interfaces 26 and 28 can include transformers to provide an open circuit inductance, and circuitry used for directing signals or data (alternatively, some or all circuitry can be included in other components, such as transmitters 16 and receivers 18).

In one example from the point of view of transceiver 12, data transmissions during normal operation from a local transmitter 16 are provided to the interface 26, which outputs the data on a corresponding channel of the communication link 24. The data is received by the link partner, the transceiver 14. The interface 28 of transceiver 14 provides the received data to its receiver 22 connected to that same channel. Furthermore, due to noise effects such as near-end crosstalk and echo, the data transmitted by transmitters 16 is also received by the near-end receivers 18 in the same transceiver. Filters can be used to filter out this noise so that the receivers 18 receive only data from other transceivers 14. In some embodiments, the transceivers 12 and 14 are asymmetric, such that data transmitted by a local transmitter has no dependence or relation with data being received by the corresponding local receiver.

Figure 2:
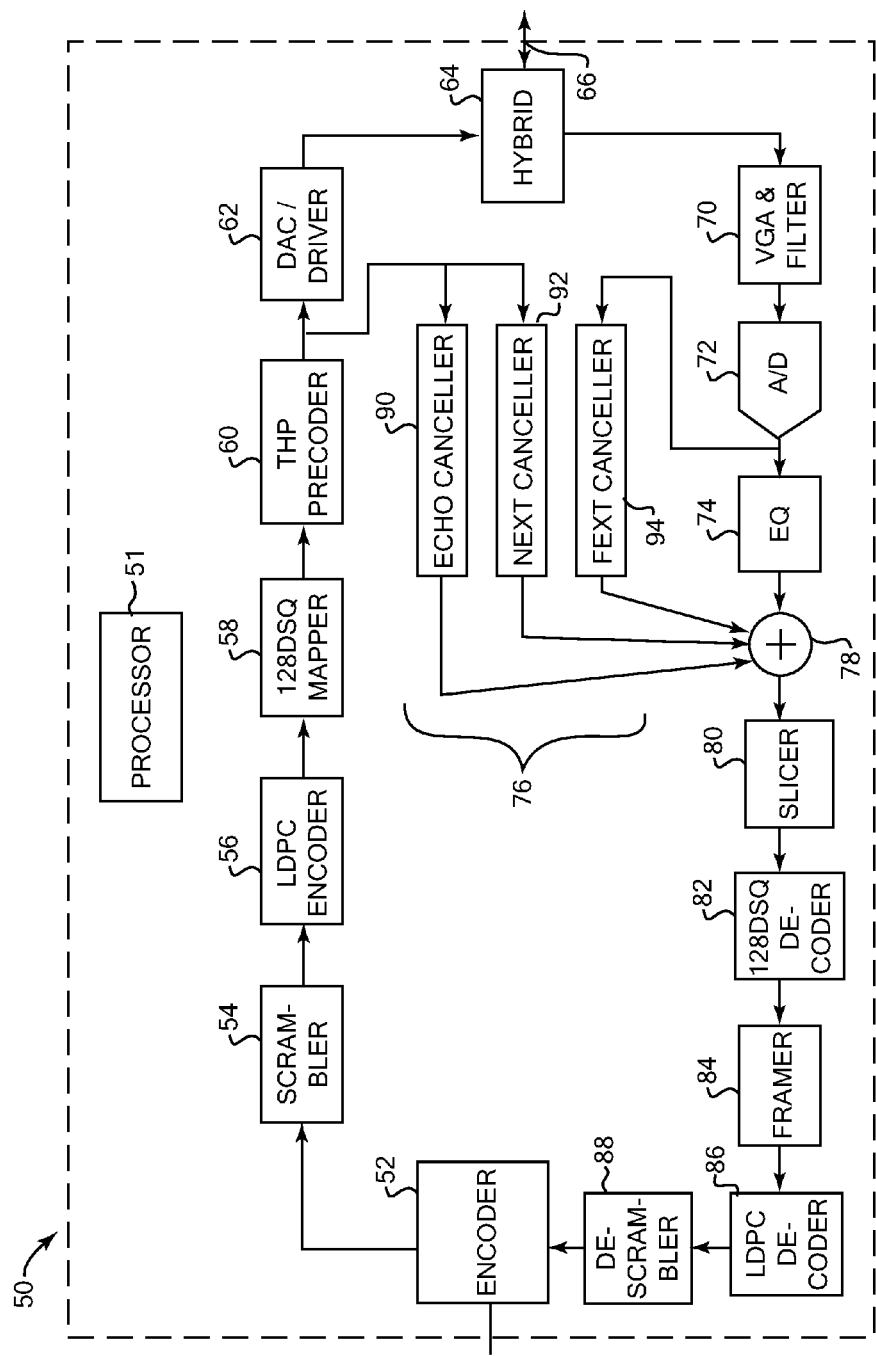
FIG. 2 is a block diagram illustrating an example of a transceiver suitable for use with the present invention.

FIG. 2 is a block diagram illustrating one example of a transceiver 50 suitable for use with the present invention. This example is suitable for a 10GBASE-T standard, but other different configurations and types of transceiver components can be used in other embodiments for 10GBASE-T or for other, different communication standards. One or more processors 51 are typically included in transceiver 50, or connected to the transceiver 50, to control various operations for the components of the transceiver; furthermore, additional hardware and/or software/firmware can be provided to implement the components themselves and can include processor functionality.

In the transmitter portion of the transceiver, an encoder 52 can be used to encode data desired to be transmitted in a particular desired format or standard. In one example, the encoder 54 can be an Attachment Unit interface (XAUI) Physical Coding Sublayer (PCS). The encoder 52 can be followed by a scrambler 54 for self-synchronized scrambling of the data to be transmitted, providing clock transitions, a statistically random power spectrum for EMI (electromagnetic interference) control, equalizer convergence, etc. A low density parity check (LDPC) encoder 56 encodes the data according to the parity check for error correction. A 128DSQ mapper 58 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 60 can then be used to adjust the transmitted signal to help with equalization of the signal received at the link-partner. An analog front end (AFE) for the transmitter can include a digital-to-analog converter (DAC) and driver block 62 which converts the data to analog form for transmission and transmits the data via the hybrid coupler 64 to the channel 66.

In a receiver portion of the transceiver 50, data is received at the hybrid coupler 64 and is sent to an analog front end (AFE) for the receiver which can include a variable gain amplifier (VGA) and filter 70 for filtering, and an analog-to-digital converter (A/D) 72. An equalizer block 74 can include one or more equalizers to remove intersymbol interference (ISI). The output of the equalizer block 74 is summed with the outputs of filters 76 (described, below) at adder 78, and the output of the adder can be provided to a slicer 80 which can provide an average noise level in the received signal. The signal can then be provided to a DSQ128 decoder 82, which outputs decoded data to a framer 84 that extracts frames from the received data and provides the frames to an LDPC decoder 86 which error-corrects the data. The data can then be provided to a de-scrambler 88 which outputs de-scrambled data to the encoder 52 for provision to a connected computer system, processor, or other device.

The filters 76 are used to reduce noise which may be introduced in the transmission and reception of data over one or more communication channels. Electromagnetic coupling can occur multiple wires sending multiple signals to one another and may result in interference from one channel to another, which is called near-end crosstalk (NEXT) or far-end crosstalk (FEXT). At the same time, a signal traveling in a channel can reflect back off of the imbalances in the channel and interfere with itself, which is called signal echo. Filters 76 thus include an Echo canceller 90, a Near End Crosstalk (NEXT) canceller 92, and a Far End Crosstalk (FEXT) canceller 94. The filters 76 cancel out the effect of signal echo and crosstalk from adjacent lines to achieve an acceptable bit error rate. The output of the THP precoder 60 in the transmitter portion of the transceiver 50 also is provided to the Echo canceller 90 and the NEXT canceller 92, which calculate the values for cancellation of echo and NEXT and output these values to the adder 78. Similarly, the output of A/D 72 is also provided to the FEXT canceller 94, which calculates the values for cancellation of FEXT and outputs the values to the adder 78. For example, the digital values of echo and crosstalk calculated by the filter are subtracted from the incoming noisy analog data (digitized by A/D 72) by adder 78 to provide received data with reduced noise.

Figure 3:
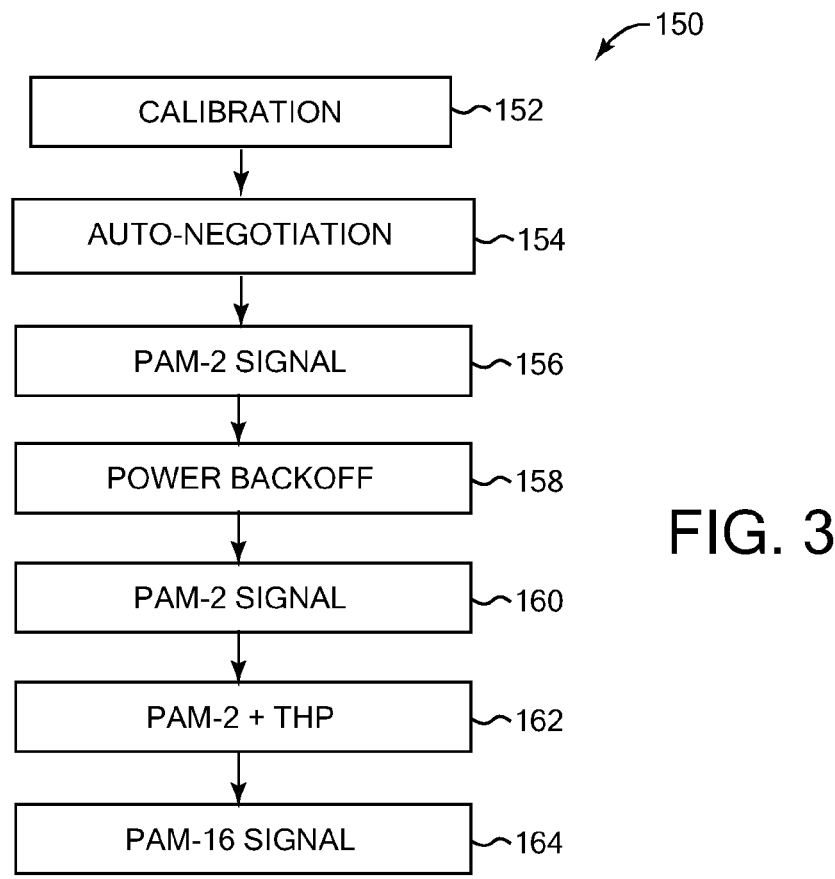
FIG. 3 is a diagrammatic illustration of an embodiment of a standard full training sequence used to train the parameters of a transceiver.

FIG. 3 is a diagrammatic illustration of an example of a standard full training sequence 150 used to train the parameters of a transceiver to achieve the fully-functional nominal operation of data communication over a communication link. The nominal operation is a predefined level of operation at which parameters are at a particular target level (such as bit error rate being under a particular target rate), and for which the transceiver can transmit and receive data over the link. The full training sequence 150 is a predefined sequence of stages or steps known by the link partners, although the boundaries of the stages can be overlapped or blurred in some embodiments. Sequence 150 typically occurs at a predefined point of operation, such as at startup when a transceiver is powered on or is first connected to a communication link. During nominal operation, after the full training sequence, the transceiver continues to adapt parameters to changing characteristics of the link based on received data. However, some characteristics change so quickly that the receiver cannot adapt quickly enough, due to noise, interference, or other disturbances, which sometimes cause the loss of the link. In existing standards, the full training sequence is used to re-train transceiver parameters when a transceiver loses a communication link and thereby re-establish the communication link. (Losing the link and the transceiver not communicating data, followed by the full training sequence, is referred to herein as "dropping" the link). The full training sequence example of FIG. 3 is an example pertinent to the 10GBASE-T communication standard, but other full training sequences can be used in other embodiments for use with the present inventions. The present inventions introduce a fast retrain sequence which can be used instead of or before the full training sequence 150 after loss of a link, as described below with respect to FIG. 4.

The full training sequence 150 can optionally first include a calibration stage 152. This stage is typically not part of a communication standard, but it is often required to allows the transceiver components to operate near optimal condition. For example, the calibration 152 can include calibration of AFE components of the transceiver such as a DAC, line driver, low pass filter, gain stage, and A/D. Calibration may take processing time on the order of 1 or more seconds in many implementations. Some embodiments may skip or reduce the calibration stage 152. In some embodiments, calibration does not only occur in stage 152, but can continue to occur during parts or all of the training or re-training sequence.

An auto-negotiation stage 154 occurs next. The auto-negotiation involves link partners communicating across the communication link to establish the common conditions under which the normal data communication will operate. For example, the auto-negotiation can include determining which communication standard to use (Ethernet 100Base-T, 10GBASE-T, etc.), and determining which of the link partners will be the Master and which one will be the Slave (the Slave recovers timing information from the Master needed for communication). For the fast retrain embodiments of the present invention, additional information related to fast retrain can also be communicated during auto-negotiation, such as whether both link partners support fast retraining, and whether both link partners support and wish to use asymmetric fast retraining or whether symmetric fast retraining will be used (explained in greater detail below with respect to FIG. 5). The auto-negotiation process can take processing time on the order of seconds, e.g., 2 seconds, in many implementations.

During the following stages 156 to 164, updating and adaptation of filters and equalizers (such as filters 76 and equalizer 74) can be performed, as well as clock and timing recovery. For example, the updating of filters including echo cancellers, NEXT cancellers, FEXT cancellers, and equalizers in the receiver can be performed based on the training signal provided during these training stages. The clock and timing recovery can also be performed by the Slave transceiver during all or most stages of the training sequence synchronize with the Master. For example, the clock frequency and the clock phase can be adjusted at the Slave to be synchronized to the Master during the clock recovery, by adjusting the frequency offset and the phase offset between Master and Slave to compensate for any drift in frequency and phase. The frequency offset and phase offset adjustment, for example, can be performed continuously (or approximately continuously) throughout the full training sequence, e.g. stages 156 to 164.

A pulse amplitude modulation-2 (PAM-2) training signal transmission can occur next in stage 156. The PAM-2 signal transmissions used for a full training sequence are well known. A PAM-2 signal has only 2 levels of signal to transmit (e.g., bits are translated to either of two signal levels, e.g., +1 V and −1 V), and since the levels are further apart than in a modulation scheme having a greater number of levels, PAM-2 is easier to decode and to detect in a higher-noise environment and is suitable for transmission during training, when the communication may be more noise- and error-prone. In other embodiments, other modulations or formats of signals can be used for training signals as appropriate. In contrast, DSQ128 signals are used during normal transmission for the 10GBASE-T format, which similarly to PAM-16 allows 16 levels of signal after the receiver parameters have been trained, which allows many more signal levels to be used. The PAM-2 signal sent in stage 156 can be used to determine a transmitter gain and a setting for the power backoff adjustment of stage 158, among other functions such as adapting filters and equalizers and clock/timing recovery. Furthermore, during stage 156 the receiver gain may be determined so that the receiver gain can be updated and adapted.

In the next stage 158 of the training sequence, a power backoff stage occurs. In this stage, the power level used for transmission is reduced down to the minimum level needed for communication (e.g. a shorter cable length may require less power), thus saving power during operation and reducing noise such as crosstalk to and from adjacent communication ports of the transceiver. For example, the link partners negotiate a power backoff level by exchanging information indicating the required power that the other link partner needs and settling on a level. The transceiver adjusts the transmitter gain to the determined level to back off the power level for transmission. The transceiver also can adjust the receiver gain in stage 158 based on the path of the entire channel of transmission/reception, where the receiver gain for more optimal operation can be determined in the prior stage 156. The receiver gain also can be adjusted at one or more later times during other stages after stage 158.

In stage 160 of the training sequence, a PAM-2 training signal is again transmitted as a training signal. In addition to the filter and equalizer adapting, clock and timing recovery, and any other adjusting, the coefficients for a precoder in the link partner transmitter can also be determined in stage 160. For example, in 10GBASE-T, the coefficients for Tomlinson-Harashima Precoding (THP) are determined for the link partner transmitter. Furthermore, the determined THP coefficients are exchanged by the link partners 160 so that each transceiver has the appropriate precoder coefficients as determined by its link partner, and the receiver is synchronized with the transmitter that is now using the precoding. In stage 162, the PAM-2 training signal is transmitted with the precoding, such as the THP type of precoding in the described embodiment, using the appropriate coefficients and other parameters determined in stage 160. The precoding applied to the PAM-2 signal allows the far-end receiver to retune its filters for the potential difference between optimal operating points with and without the precoding, so that the same adaptation can be used during normal transmission (since THP is sent by the transmitter, it is not adapted to during normal data reception by the receiver). Finally, in stage 164, a PAM-16 type of signal or similar signal (such as a signal having greater levels than PAM-2) is transmitted as a training signal (including training data), which allows receiver parameter adaptation to be performed with a signal that has the same characteristics as the signal used during nominal operation. For example, DSQ128 type of modulation is provided in 10GBASE-T, and so the training signal for stage 164 is DSQ128. After sending the PAM-16 training signal for an appropriate time to adapt the filters, equalizers, timing, and other components, the training sequence is over and normal operation begins During normal operation, actual data is transmitted and received by the transceiver as PAM-16 signals.

Overall, the time taken to perform stages 156 through 164 is typically on the order of seconds, e.g. about 2 seconds. Thus, the overall time taken by the training sequence 150 may be on the order of 5 seconds. However, during a retraining period after a link has been lost, not all of these stages are necessary. The present invention therefore provides a fast retraining sequence that performs only some of the parameter adjustments, and/or performs other techniques, so that normal operation can be resumed more quickly. This avoids the lengthy delays (such as 5 seconds) which are normally required when doing a full raining sequence after the link is lost, as in the prior art.

Figure 4:
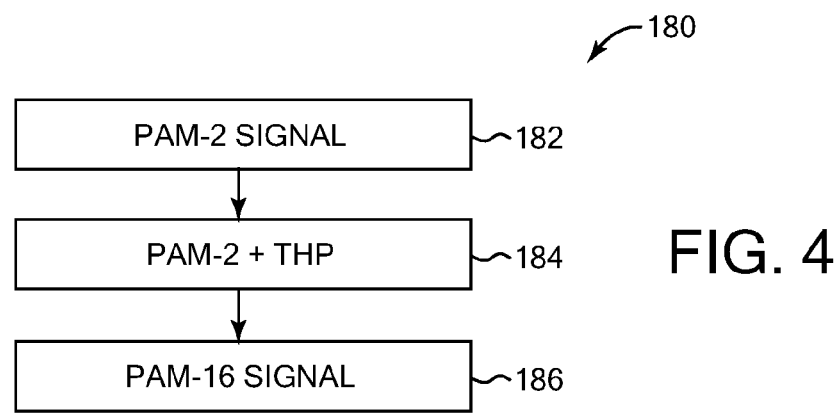
FIG. 4 is a diagrammatic illustration of an example of a fast retraining sequence of the present invention.

FIG. 4 is a diagrammatic illustration of an example of a fast retraining sequence 180 of the present invention which can be used to train the parameters of a receiver to achieve fully-functional nominal operation after a link has been lost. The full training sequence as shown in FIG. 3 may not be needed in many cases after a link is lost, as many of the receiver parameters may remain the same after retraining. The time and processing resources used to recalculate parameters that remain the same is mostly wasted when using the full training sequence for retraining. Thus, the fast retraining sequence 180 can be used instead, which is a known sequence of stages or steps that are employed to train particular parameters in response to a link being lost, i.e. the link no longer has acceptable communication characteristics to allow data communication (such as based on bit error rate and/or signal to noise ratio, etc.). Since the fast retraining sequence is much quicker than the full training sequence, herein the link is not considered to have been "dropped" or "failed" (according to the predefined communication standard used) unless the full training sequence is used for retraining, which would typically be after the fast retraining sequence has failed to restore the link. The fast retraining sequence 180 shown in FIG. 4 is an example corresponding to the full training sequence embodiment 150 shown in FIG. 3. However, there are no rigid requirements for the fast retraining sequence, and it can vary substantially in different embodiments.

The fast retraining sequence 180 first provides a PAM-2 stage 182. A PAM-2 training signal transmission is performed at this stage similarly to the PAM-2 transmission of stage 160 of the full retraining sequence 150 of FIG. 3, to allow updating of transceiver parameters. THP precoding coefficients can also be determined and exchanged in stage 180, and the receiver synchronized with precoded transmission data from the far-end link partner transmitter, similarly to stage 160. The PAM-2 stage 182 is not used for determining transmitter gain for power backoff like the PAM-2 stage 156 of FIG. 3, since there is no power backoff adjustment stage in the sequence 180, and neither is receiver gain determined. In other embodiments, other types, modulations, or formats of signals can be used for training signals as is appropriate.

In the next stage 184 of the fast retraining sequence, the PAM-2 training signal is transmitted having a Tomlinson-Harashima Precoding (THP) type of encoding, similarly to stage 162 of the full training sequence 150. Finally, in stage 186, a PAM-16 signal is transmitted as a training signal (such as DSQ128 for 10GBASE-T), which allows receiver parameter adaptation to be performed under a signal that has the same characteristics as the signal used during nominal operation. After a predetermined period of time sending the PAM-16 training signal, the fast retraining sequence is over and normal operation begins, in which actual data is transmitted and received by the transceiver as PAM-16-type signals (or other type of modulated signal suitable for the communication protocol being used).

In some embodiments, a particular Master and Slave communication order can be followed for the fast retrain sequence 180. For example, the Master link partner of the link can transmit the PAM-2 training signal of stage 182 while the Slave is silent. When the Master is ready to receive the training signal from the Slave, it can indicate this through an appropriate mechanism, such as Infofield exchange which is a standard protocol to exchange data during training, such as during the transitions between different training stages. As soon as the Slave receives the permission and when the Slave is ready, it starts transmitting the PAM-2 training signal in its own stage 182. After some time, the Master initiates the THP coefficient exchange in this same stage, e.g. using Infofield exchange or similar mechanism. After Master and Slave have exchanged their THP coefficients, they continue with PAM-2/THP training at stage 184, and they finish with the PAM-16-THP training of stage 186, which again can be synchronized through an appropriate mechanism such as Infofield exchange.

In some embodiments, an exchange mechanism used during the fast retrain sequence 180 to exchange needed information between link partners, such as Infofield exchange, can be made faster in duration than the normal duration used in the full training sequence, to provide a faster transition. For example, an Infofield exchange may have a timing based on a timer count of 100 in the normal full training sequence, but this timing can be reduced to a count of 10 when used in the fast retraining sequence of the present invention. This allows the exchange sequence to maintain a consistent emphasis on lower time duration as in the fast retraining sequence, unlike the full training sequence.

The fast retraining sequence 180 has omitted several stages of the full training sequence 150 and only adjusts some of the transceiver parameters. For example, no calibration of transceiver components needs to be performed again, so a calibration equivalent to stage 152 of sequence 150 is omitted. Furthermore, there is no auto-negotiation stage similar to stage 154 performed in the fast retraining sequence, since the parameters agreed upon during the previous auto-negotiation are assumed to not have changed. There is also no determining and setting of a power backoff (PBO) level (as in stages 156 and 158) in the fast retraining sequence 180, because factors influencing transmission power level are assumed to be the same, e.g., the cable length is typically going to be the same. Thus, transmitter gain does not have to be determined again for power backoff. The determination and changing of receiver gain is also omitted in sequence 180 since the entire gain of the transmission path is assumed to have not changed significantly. Furthermore, the frequency offset between link partners is not determined, changed or synchronized in the fast retraining sequence 180, since it would not likely have changed significantly during operation from temperature differences or other environmental changes Therefore, the present invention assumes that the frequency offset determined at the initialization and/or last full training sequence has remained substantially the same.

In some embodiments, the fast retraining sequence of the present invention can use one or more current parameters at the time of retraining (i.e., when the communication link is lost) without updating these parameters, i.e., retain or keep those current parameters intact and use those them as the initial conditions in the fast retraining sequence 180. These current parameters can include the parameters omitted in the fast retraining sequence as described above (e.g., transmitter gain, receiver gain, power backoff level, AFE calibration, auto-negotiation, clock frequency offset), and can also include parameters that will be changed during fast retraining, such as current filter settings, THP coefficients, and clock phase offset, and using the current parameters as initial parameter values. In contrast, the full training sequence 150 of FIG. 3 does not take any existing initial conditions as a starting point, and always starts initializing all parameters from scratch when used at startup or for retraining. The present invention's use of the current parameters as initial conditions for a fast retrain allows a faster retraining process. The current parameters at the time that the link is lost are much closer to optimal than when initializing the parameters from scratch at startup with the full training sequence, and so the retraining period is much shorter. For example, the PAM-2 stage 182, PAM-2 and THP stage 184, and PAM-16 stage 186 are typically shorter during the fast retraining sequence 180 than during the full training sequence 150 when using at least some of the current parameters as initial parameter values.

Overall, the fast retraining sequence of the present invention retains and does not change the values of one or more of the parameters that have not substantially changed during normal operation since the last full training sequence for the transceiver. Thus, the full retraining sequence removes stages or portions of stages from the full training sequence that can be omitted during retraining. The particular stages that can be omitted in the fast retraining sequence for retraining are those stages affecting parameters that have not changed substantially or significantly since the previous full training, e.g., typical changes in the link conditions do not significantly affect these parameters. These parameters are relatively or substantially fixed in their previous values/states and not changed during the fast retraining. Furthermore, initial conditions have already been established for the receiver during initialization, full training, and/or normal operation, and these initial conditions are used for the fast training. When a link is lost during nominal operation, the parameters may vary a small amount from their optimal state but they do not have to be initialized from scratch since such initialization was already performed during the full training sequence.

Since several of the stages of the full training sequence have been omitted for the fast retraining sequence, and since retraining generally takes less time due to the use of current parameters at the time of link loss, the retraining of parameters according to the present invention takes a much shorter time than retraining in prior implementations, which used the full training sequence even for retraining. For example, the fast retraining example of FIG. 4 might take on the order of 10's or 100's of milliseconds, while retraining using the full training sequence 150 of FIG. 3 (or similar sequences) can take on the order of 5 seconds.

Figure 5:
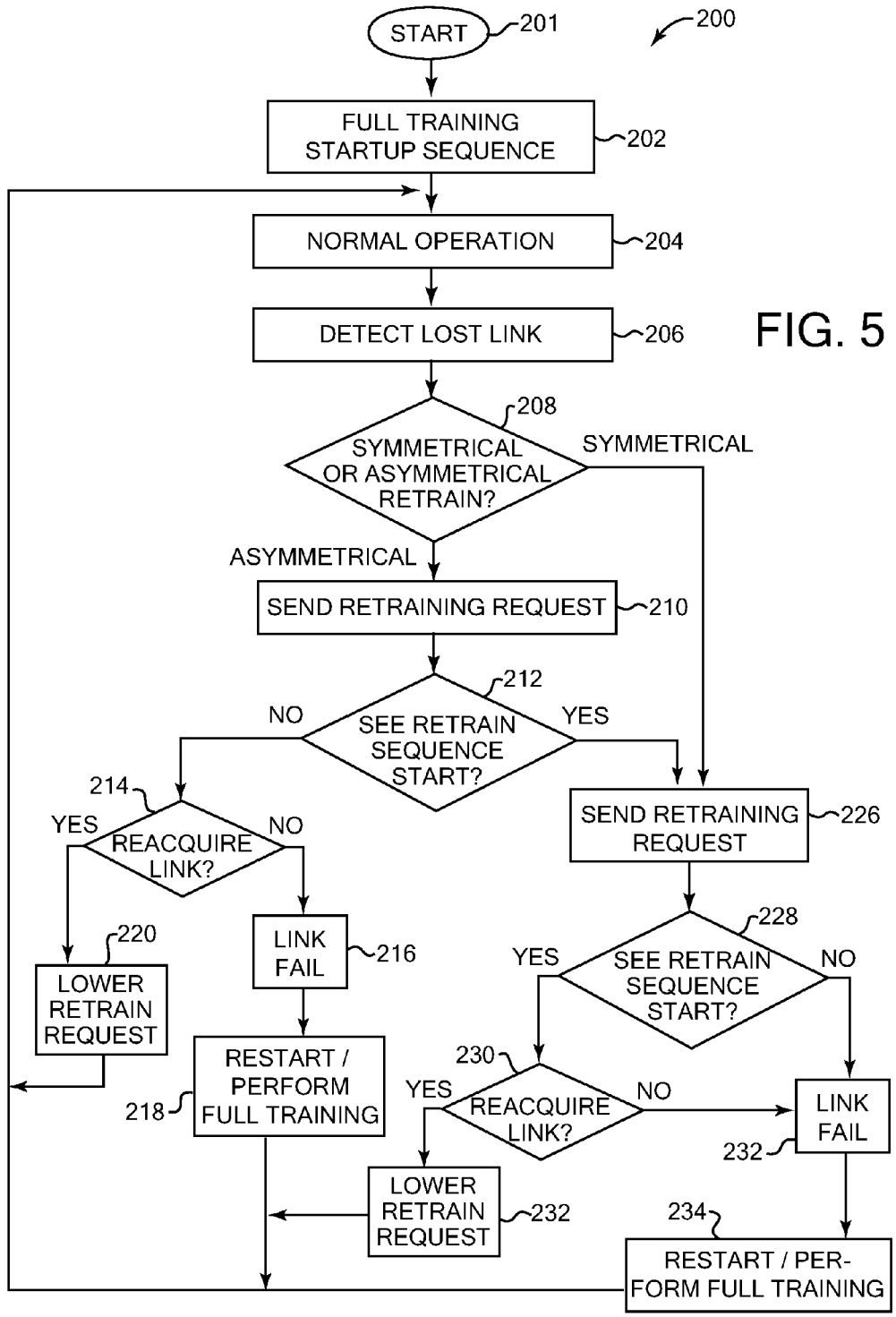
FIG. 5 is a flow diagram illustrating a method of the present invention for providing a fast retraining of transceiver parameters.

FIG. 5 is a flow diagram illustrating a method 200 or protocol of the present invention for providing a fast retraining of transceiver parameters in response to a communication link being lost. The method 200 can be implemented by any of various components of the transceiver, including one or more processors or other controllers provided in or connected to the transceiver (such as in a connected computer system or electronic device) and controlling the appropriate transceiver blocks for retraining. The method 200 can be implemented in hardware, software/firmware, or a combination of hardware and software. In some embodiments, some or all of the steps of the method can be implemented using program instructions stored on a computer readable medium. The medium can be an electronic, magnetic, optical, electromagnetic, infrared, or semiconductor system (or apparatus or device), for example. Examples of computer-readable storage medium media include a semiconductor or solid state memory, magnetic tape, a removable computer diskette, a random access memory (RAM), a read-only memory (ROM), a rigid magnetic disk and an optical disk (CD-ROM, DVD-ROM, etc.).

For method 200, it is assumed that two link partners are communicating over a communication link and that both link partners are capable of recognizing and implementing the fast retraining of the present invention. The example method of FIG. 5 is described in relation to the example of using the 10GBASE-T Ethernet communication standard, but other standards can be used in other embodiments.

The method begins at 201, and in step 202, a full training startup sequence is performed for the transceiver in response to the transceiver being powered on or otherwise started or initialized. In a 10GBASE-T system, and similarly in other systems, there are many transceiver parameters which are initialized and adjusted during the training startup sequence, many of which are described above with reference to FIG. 3. The training startup sequence includes auto-negotiation, where the link partners determine the characteristics and parameters to use for communication, such as the standard Ethernet protocol being used, the Master and Slave status of the link partners, etc. This can include whether both link partners support the fast retraining process of the present invention, and if so, whether to use asymmetric and/or symmetric fast retraining, as described in greater detail below. For example, extra, unused, or vendor-specific bits or fields in the auto-negotiation process can be used to communicate fast retraining capability.

In step 204, normal (nominal) operation of both link partner transceivers is performed, including data communication such as transmitting and/or receiving of data over the communication link. The parameters of the transceiver trained in step 202 are used for optimized transceiver operation given the current communication environment.

In step 206, the communication link is detected to have been lost. A lost link can occur based on any of a number of different disturbances or causes. For example, an external disturbance or stress may have been applied to the communication link, such as a mechanical deformation or bend in a physical cable of the link. Or, radio frequency (RF) interference may suddenly occur in the link from an external source that is turned on or applied, such as a signal transmission from a radio or other transmitter.

Different criteria can be used in different embodiments to determine that a link has deteriorated, sufficiently to be considered "lost" such that normal data communication can no longer be reliably performed over that link. In some embodiments, the same criteria used to determine whether a link is "dropped" or "failed" according to the employed communication standard can also be used to determine whether the link is lost for purposes of using the fast retraining of the present invention. For example, two characteristics of the transmissions can be examined: signal to noise ratio (SNR) and the error rate. In some embodiments (e.g., in some 10GBASE-T embodiments), these characteristics can be checked using receiver components. For example, an SNR can be estimated based on an average noise approximation determined from the slicer 80 in the receiver (as shown in FIG. 2), where the slicer averages noise in a signal by subtracting the signal level from the closest modulated signal level. An error rate in the signal can be determined, using an LDPC decoder 82 or CRC decoder, e.g., an LDPC decoder can determine whether a frame of data is error-free or not. In one example, multiple conditions can be checked to determine whether the link has been lost, and any of the conditions can designate a lost link. For example, one condition can be a predetermined number (e.g., 40) of consecutive frames that have an LDPC error.

Another, independent, condition can be an error rate that is above a predetermined threshold. Additional or other conditions can be used in other embodiments (e.g., a predetermined number of CRC errors), and a combination of different conditions can be also be required to designate a lost link. The conditions invoking the fast retraining sequence (or fast retrain request) can be the same conditions used for detecting a dropped link that causes a full retraining process according to the employed communication standard, where the fast retrain process of the present invention can first be attempted. Alternatively, particular conditions can be checked for a lost link for the purpose of a fast retrain, as well as different conditions checked for the purpose of a full retraining. It should be noted that the link is considered "lost" only for purposes of receiving data; data can still be transmitted normally by the transmitter of the transceiver experiencing the lost link, if a link partner is healthy enough to receive that data.

The conditions for link loss are monitored during the normal operation of the link. In general, for a decision-directed communication system, if the rate of changes in the communication channel(s) and the noise sources influencing the communication become faster than the update rate of the receiver parameters, then the receiver cannot keep up with these changes because the receiver operating point deviates significantly from the optimal point. This can cause the estimated error signal calculated from the decoded data to be a poor representative of the real error signal, which causes updating with parameters that are far from optimal, causing in turn further error in the decoded data. This creates a positive feedback loop that deteriorates the receiver operation quickly, and usually results in the loss or failure of the communication link.

In step 208, it is checked whether asymmetrical or symmetrical fast retraining mode is to be used. The fast retrain protocol of the present invention allows either type of retraining to be used, and some embodiments may use one only type, while others may allow both types. Overall, symmetrical fast retraining causes both link partners to send a fast retraining sequence simultaneously, while asymmetrical fast retraining allows one link partner to receive a fast retraining sequence while the other link partner receives normal transmitted data.

In symmetrical fast retraining mode, one example protocol is as follows. One link partner transceiver decides independently that the link has been lost and to enter fast retrain mode which starts the fast retraining process for both its transmitter (s) and its receiver(s). The transceiver starts sending a fast retrain signal to the other link partner immediately (described below), and the link partner, detecting the lack of normal transmission signal and detecting higher disturbance (e.g. error rate and/or SNR) caused by the fast retrain signal (or detecting the fast retrain signal itself), is automatically forced to follow the first transceiver into fast retrain mode and send its own fast retraining signal. The second link partner may not have had cause to lose the link and start fast retrain mode, but it is forced to start the fast retrain process by the first link partner. Thus both link partners are operating in fast retrain mode in the symmetric type of operation.

In asymmetric operation mode, one healthy link partner may continue to receive data transmitted from the other link partner, but the other link partner has experienced a link loss and must enter fast retrain mode and update parameters before it can receive data. An example protocol is as follows. One of the link partner transceivers enters fast retrain mode while the other link partner continues normal operation and data communication by sending and receiving over the communication link. For example, only one of the link partners may be experiencing noise or errors sufficient to lose the link and start retraining parameters, while the other link partner may have good enough conditions to keep operating normally. In this operation, normal data continues to be transmitted from the transmitter on the lost-link transceiver (i.e., the transceiver that has determined that the communication link has been lost) to the receiver of the healthy transceiver over the link, but normal data cannot be transmitted from the transmitter of the healthy transceiver to the receiver of the lost-link transceiver, since the lost-link receiver must re-adapt. Thus, according to one protocol of the present invention, the lost-link transceiver requests that the link partner transmitter start transmitting a fast retrain signal/sequence for the lost-link transceiver. However, if the link partner does not respond to this fast retrain request within a predetermined period of time, then the lost-link transceiver can enter symmetrical fast retrain mode to force the other side to send a fast retrain signal, as described in greater detail below. Other types of protocols can be used in other embodiments to allow simultaneous dual fast retraining sequences or single-side fast retraining sequences.

The selection of symmetrical or asymmetrical fast retraining can be determined in any number of different ways in various embodiments. For example, the link partners may have negotiated to use symmetric or asymmetric fast retraining, or symmetric or asymmetric fast retraining may be the default option or condition, If symmetric fast retraining is determined as the type to be used, then the process continues to step 226, described below. If it is determined to use asymmetric fast retraining, then step 210 is performed, in which the lost-link transceiver sends a fast retrain request to the link partner transceiver. The fast retrain request can be any predetermined signal which can be recognized according to the fast retrain protocol. In some embodiments, the fast retrain request is encoded in normal data that is being transmitted to the link partner, so that the link partner receives the request along with the normally-transmitted data. Since the lost-link transceiver is in asymmetric mode, it is still transmitting data on the link for the (presumably) healthy link partner to receive normally. For example, LDPC frames include a redundant, auxiliary bit which is usually set to a default value, and which can be used to indicate fast retrain request encoded within transmitted data. In other embodiments, a transmitted packet includes a number of control words which are added by a Media Access Control (MAC) layer, and one or more of these control words may be additional or redundant and can be encoded with the request for fast retraining. The link partner is expected to decode the encoded fast retrain request according to the known protocol, e.g., use the PHY to decode the MAC-added control words, or decode the proper LDPC bit, and to immediately initiate the fast retraining sequence by sending the fast retrain signal to the requesting link partner.

In next step 212, the lost-link transceiver checks whether the retraining sequence start has been received. As described above for FIG. 4, the start of the fast retraining sequence can be a special training signal, such as a PAM-2 signal that is easier to transmit and receive without error over more difficult link conditions. In some embodiments, the check at step 212 can be performed within or just after a predetermined period of time from the sending of the retrain request in step 210, so as to set a time limit on the checking of the fast retrain signal from the link partner.

If the start of the retrain signal is detected at step 212, then the process continues to step 214, where it is checked whether the communication link has been reacquired, i.e. whether the fast retrain process has succeeded in restoring the lost communication link. In some embodiments, the check of step 214 can be performed within or just after a predetermined period of time from seeing the retraining sequence start in step 212, which is designated to allow the link to be reacquired. For example, the predetermined time period may be a time period sufficient to allow all the steps of the fast retraining sequence to be performed.

If the link is not reacquired at step 214, then in step 216 the link has been considered failed or "dropped." This may occur because one or more parameters could not be updated and adapted sufficiently by the fast raining sequence, for example. Thus, in next step 218 the full training is re-star as the re-training procedure. The full training sequence started at step 218 may be the same as, or slightly different than, the startup full training sequence performed in step 202, depending on the implementation used. For example, some embodiments may be continually performing a calibration of analog front end components during training, and so may not start calibration from scratch at step 218, unlike at step 202. After performing the full training sequence, the process returns to normal operation at step 204 (assuming the link has been reestablished).

If the link is reacquired at step 214, then the process continues to step 220, in which the lost-link transceiver lowers its retrain request, stops encoding a fast retrain request in data being transmitted to the link partner. The process then returns to step 204 to continue the normal operation of the transceiver for communicating data over the link.

If the start of the retrain signal is not detected from the link partner a step 212, then the link partner may not have received the retrain request, and/or the link partner may also have lost the link. For example, in some instances, both the lost-link transceiver and the link partner may lose the link substantially simultaneously or close in time. In some embodiments, the process waits a predetermined period of time from the retrain request of step 210 before performing the check of step 212. In the case of no detection of the start of the fast retrain signal, asymmetric fast retrain mode is assumed to not be functional. Thus, if the retrain signal start is not detected at step 212, or if symmetric fast retrain mode has been selected for other reasons, the process continues to step 226, where the (first) lost-link transceiver sends the fast retraining sequence to the link partner (which now is the second lost-link transceiver). In essence, the first lost-link transceiver is assuming that the link partner has also experienced a lost link, and is attempting a fast retrain of the link partner to allow resumption of its normal operation as quickly as possible. The fast retraining sequence can include particular steps and can omit several training parameters used in the full retrain process, as described in greater detail above with respect to FIGS. 3 and 4.

In step 228, the first lost-link transceiver checks whether the fast retraining sequence start has been received from the link partner. As described above for step 212, the start of the fast retraining sequence can be a particular training signal. If the start of the retrain signal is detected at step 228, then the process continues to step 230, where it is checked whether the communication link has been reacquired, i.e. whether the fast retrain process has succeeded in restoring the lost communication link for the first lost-link transceiver. In some embodiments, the check of step 230 can be performed within or just after a predetermined period of time from detecting the retraining sequence start, which is designated to allow the link to be reacquired. For example, the predetermined time period may be a time period sufficient to allow all the steps of the fast retraining sequence to be performed.

If the link is not reacquired at step 230, then in step 232 the link is considered failed, and in step 234 the full training sequence is re-started and performed as the re-training procedure (similarly to steps 212, 214, 216 and 218 described above. The full training sequence started at step 218 may be the same as, or slightly different than, the startup full training sequence performed in step 202, depending on the implementation used. For example, some embodiments may be continually performing a calibration of analog front end components during training, and so may not start calibration from scratch at step 218, unlike at step 202. After performing the full training sequence, the process returns to normal operation at step 204 (assuming the link has been reestablished).

If the link is reacquired at step 230, then the process continues to step 232, in which the lost-link transceiver lowers its retrain request, e.g., stops encoding a fast retrain request in data being transmitted to the link partner. The process then returns to step 204 to continue the normal operation of the transceiver for communicating data over the link.

The present invention recognizes that, in many cases, not all of the transceiver parameters have to be retrained after a link is lost. A sudden change in channel response or an abrupt change in noise spectral density may only impact the optimal settings of some of the filters and may not impact the optimal settings for a subset of parameters Examples of such parameters include receiver and transmitter gain, analog front-end calibration parameters, frequency offset, etc., which do not have be changed during the retraining process. This hastens the retraining process and allows a link to be reacquired more quickly, resulting in more robust communication.

Although the present invention has been described in accordance with the embodiments shown, one of ordinary skill in the art will readily recognize that there could be variations to the embodiments and those variations would be within the spirit and scope of the present invention. For example, other network standards can be used with the embodiments shown where similar requirements are applicable. Accordingly, many modifications may be made by one of ordinary skill in the art without departing from the spirit and scope of the appended claims.

The invention claimed is:

1. A method of signaling along a link between respective Ethernet transceivers, the method comprising:
    performing a pre-defined full training sequence to train a set of link parameters associated with the Ethernet transceivers, the full training sequence including a plurality of steps including transmission of a first DSQ128 training signal;
    transmitting operational data along the link based on the trained link parameters;
    detecting a link condition preventing operational data transmission above a threshold criteria;
    re-training the link in response to the detecting, the re-training having a sequence of steps fewer in number than the full training plurality of steps, the re-training comprising:
        exchanging a first PAM-2 training signal between the transceivers;
        exchanging a second PAM-2 training signal encoded in accordance with a Tomlinson-Harashima Precoding (THP) type of encoding; and
        exchanging a second DSQ128 training signal.

2. The method according to claim 1 wherein:
    the full training sequence plurality of steps comprises at least four from the group comprising auto-negotiating, backing-off power, calibrating front end components, changing frequency offsets, exchanging a third PAM-2 training signal, exchanging a fourth PAM-2 training signal encoded in accordance with a THP type of precoding, and exchanging a third PAM-16 training signal.

3. The method according to claim 1 wherein:
while transmitting operational data, adapting one or more of the trained parameters based on received operational data.

4. The method according to claim 1 wherein the re-training sequence comprises asymmetrically re-training.

5. The method module according to claim 4 wherein asymmetrically re-training comprises:
receiving a re-training sequence from a first transmitter in a first of the respective transceivers; and
receiving operational data from a second transmitter in a second of the respective transmitters.

6. The method according to claim 1 wherein the re-training sequence comprises symmetrically re-training.

7. The method according to claim 6 wherein symmetrically re-training comprises:
receiving a first re-training sequence from a first transmitter in a first of the respective transceivers; and
receiving a second re-training sequence from a second transmitter in a second of the respective transceivers.

8. The method according to claim 7 wherein exchanging a second PAM-2 training signal encoded in accordance with a Tomlinson-Harashima Precoding (THP) type of encoding comprises:
encoding a PAM-2 training signal in accordance with a THP algorithm having coefficients determined in a manner that compensates for known attenuation in the link.

9. The method according to claim 8 wherein the known attenuation comprises attenuation due to filtering from a notch filter.

10. The method according to claim 1 wherein the re-training sequence is carried out in a sequential manner in accordance with an Infofield exchange protocol.

11. The method according to claim 1 wherein the link condition is determined based on a detected signal-to-noise ratio.

12. The method according to claim 1 wherein the link condition is determined based on a detected bit error rate.

13. The method according to claim 12 wherein the detected bit error rate is determined based on decoding data encoded in accordance with a low-density-parity-check (LDPC) algorithm.

14. The method according to claim 12 wherein the link condition is determined based on a predetermined number of consecutive frames having bit errors.

15. The method according to claim 12 wherein the link condition is determined based on a bit error rate above a predetermined threshold.

16. An Ethernet transceiver for transmitting and receiving PAM-16 signals, the transceiver comprising:
a first receiver having circuitry for setting receiver operating parameters in response to a first full training sequence transmitted from a first transmitter, the full training sequence comprising a plurality of steps;
a second transmitter having transmitter operating parameters set in accordance with a second full training sequence, the second full training sequence for transmission to a second receiver;
detection circuitry to identify a signaling condition during transmission of operational data between the first receiver and the first transmitter wherein the first receiver fails to receive data with respect to a signal quality threshold; and
wherein in response to the identified signaling condition, the first transmitter operative to send a re-train request to the second receiver, such that the second transmitter transmits a re-training sequence to the first receiver, the re-training sequence comprising steps fewer in number than the full training sequence plurality of steps and at least a transmission of precoding coefficients from the first transmitter to the first receiver.

17. The Ethernet transceiver according to claim 16 wherein the first receiver and the second transmitter are disposed on the same integrated circuit chip.

18. The Ethernet transceiver according to claim 16 wherein the signal quality threshold comprises a detected signal-to-noise ratio.

19. The Ethernet transceiver according to claim 16 wherein the signal quality threshold comprises a detected bit error rate.

20. The Ethernet transceiver according to claim 16 wherein the first receiver receives the re-training sequence while the second transmitter transmits operational data.

21. The Ethernet transceiver according to claim 16 wherein the first receiver receives the re-training sequence while the first transmitter transmits a second re-training sequence.

22. The Ethernet transceiver according to claim 21 wherein the first and second re-training sequences comprise an exchange of pre-coding coefficients from the first and second transmitters to the respective first and second receivers.

23. A method of signaling along a link between respective Ethernet transceivers, the method comprising:
performing a pre-defined full training sequence to train a set of link parameters associated with the ethernet transceivers, the full training sequence including a plurality of steps to establish initial operating characteristics, and including transmission of a first DSQ128 training signal;
transmitting operational data along the link based on the trained link parameters;
detecting a link condition preventing operational data transmission above a threshold criteria; and
re-training the link in response to the detecting, the re-training based on the initial operating characteristics and having a sequence of steps fewer in number than the full training plurality of steps.

* * * * *